(12) United States Patent
Mayr et al.

(10) Patent No.: US 11,071,607 B2
(45) Date of Patent: Jul. 27, 2021

(54) METHOD OF AND SYSTEM FOR BUILDING UP A DENTAL OBJECT

(71) Applicant: 3M INNOVATIVE PROPERTIES COMPANY, St. Paul, MN (US)

(72) Inventors: Helmar B. Mayr, Kaufering (DE); Malte Korten, Moorenweis (DE); Carsten Franke, St. Paul, MN (US); Robert Leland Wee Smithson, Mahtomedi, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 350 days.

(21) Appl. No.: 15/775,044

(22) PCT Filed: Nov. 9, 2016

(86) PCT No.: PCT/US2016/061130
§ 371 (c)(1),
(2) Date: May 10, 2018

(87) PCT Pub. No.: WO2017/083382
PCT Pub. Date: May 18, 2017

(65) Prior Publication Data
US 2018/0325635 A1 Nov. 15, 2018

(30) Foreign Application Priority Data
Nov. 12, 2015 (EP) .................... 15194204

(51) Int. Cl.
*A61C 5/77* (2017.01)
*A61C 13/00* (2006.01)
(Continued)

(52) U.S. Cl.
CPC .................. *A61C 5/77* (2017.02); *A61C 7/14* (2013.01); *A61C 13/0004* (2013.01);
(Continued)

(58) Field of Classification Search
CPC .......................... A61C 13/0019; B29C 64/106
See application file for complete search history.

(56) References Cited

U.S. PATENT DOCUMENTS 5,900,207 A 5/1999 Danforth
6,129,872 A * 10/2000 Jang .................. B29C 64/40
264/75

(Continued)

FOREIGN PATENT DOCUMENTS

DE 10150256 7/2003
EP 1252867 10/2002
(Continued)

OTHER PUBLICATIONS

Azari, "The Evolution of Rapid Prototyping in Dentistry: A Review", Rapid Prototyping Journal, vol. 15, No. 3, pp. 216-225.
(Continued)

*Primary Examiner* — Jacob T Minskey
*Assistant Examiner* — Virak Nguon
(74) *Attorney, Agent, or Firm* — 3M IPC

(57) ABSTRACT

A method of building up a dental object includes steps of (i) determining the three-dimensional shape of the object; (ii) mixing at least a first and a second component to form a hardenable composition; (iii) depositing the hardenable composition through a nozzle; (iv) performing steps (ii) and (iii) in combination with moving the nozzle by computer control based on said data. The invention helps providing an object like a dental restoration at maximized geometric and optical quality.

11 Claims, 2 Drawing Sheets

(51) Int. Cl.

| | |
|---|---|
| *B33Y 10/00* | (2015.01) |
| *B29C 64/30* | (2017.01) |
| *B29C 64/314* | (2017.01) |
| *B29C 64/393* | (2017.01) |
| *B29C 64/106* | (2017.01) |
| *A61C 13/08* | (2006.01) |
| *A61C 13/087* | (2006.01) |
| *A61C 13/09* | (2006.01) |
| *A61C 13/15* | (2006.01) |
| *B33Y 30/00* | (2015.01) |
| *B33Y 80/00* | (2015.01) |
| *B33Y 50/02* | (2015.01) |
| *A61C 7/14* | (2006.01) |
| *B29C 64/118* | (2017.01) |
| *B29L 31/00* | (2006.01) |

(52) U.S. Cl.
CPC ...... *A61C 13/0006* (2013.01); *A61C 13/0013* (2013.01); *A61C 13/0019* (2013.01); *A61C 13/0022* (2013.01); *A61C 13/082* (2013.01); *A61C 13/087* (2013.01); *A61C 13/09* (2013.01); *A61C 19/003* (2013.01); *B29C 64/106* (2017.08); *B29C 64/30* (2017.08); *B29C 64/314* (2017.08); *B29C 64/393* (2017.08); *B33Y 10/00* (2014.12); *B33Y 50/02* (2014.12); *B33Y 80/00* (2014.12); *B29C 64/118* (2017.08); *B29L 2031/753* (2013.01); *B33Y 30/00* (2014.12)

(56) References Cited

U.S. PATENT DOCUMENTS

| | | | |
|---|---|---|---|
| 6,401,002 | B1 | 6/2002 | Jang |
| 7,384,266 | B2 | 6/2008 | Wen |
| 8,425,973 | B2 | 4/2013 | Dunne |
| 2002/0017743 | A1 | 2/2002 | Priedeman |
| 2002/0167100 | A1* | 11/2002 | Moszner ............... B29C 64/386 264/16 |
| 2004/0245663 | A1 | 12/2004 | MacDougald |
| 2010/0152873 | A1 | 6/2010 | Dunne |
| 2011/0050848 | A1 | 3/2011 | Rohaly |
| 2011/0104641 | A1 | 5/2011 | Sun |
| 2011/0104643 | A1* | 5/2011 | Giordano ........... A61C 13/0022 433/203.1 |
| 2011/0170977 | A1 | 7/2011 | Vagt |
| 2012/0219698 | A1 | 8/2012 | Steingart |
| 2012/0261848 | A1 | 10/2012 | Haraszati |
| 2013/0062801 | A1 | 3/2013 | Giordano |
| 2018/0185118 | A1* | 7/2018 | Sutter .................... B33Y 10/00 |
| 2018/0200944 | A1* | 7/2018 | Chan ..................... B33Y 30/00 |
| 2018/0200955 | A1* | 7/2018 | Hoelldorfer ............ B29C 64/20 |

FOREIGN PATENT DOCUMENTS

| | | |
|---|---|---|
| EP | 1661529 | 5/2006 |
| EP | 2674129 | 12/2013 |
| JP | 2002-282280 | 10/2002 |
| JP | 2012-045190 A | 3/2012 |
| WO | WO 2007-084768 | 7/2007 |
| WO | WO 2012-052510 | 4/2012 |
| WO | WO 2012-078533 | 6/2012 |
| WO | WO 2012-152511 | 11/2012 |
| WO | WO 2013-095968 | 6/2013 |

OTHER PUBLICATIONS

Bisheh, "Application of Rapid Prototyping Technology in Dentistry", International Journal of Rapid Manufacturing (IJRAPIDM), 2011, vol. 2, No. 1/2, pp. 104-120.

Liu, "Rapid Prototyping in Dentistry: Technology and Application", The International Journal of Advanced Manufacturing Technology, Jun. 2006, vol. 29, No. 3-4, pp. 317-335.

Sun, "The Application of Rapid Prototyping in Prosthodontics", Journal of Prosthodontics, Dec. 2012, vol. 21, No. 8, pp. 641-644.

International Search Report for PCT International Application No. PCT/US2016/061130, dated Jan. 20, 2017, 4pgs.

* cited by examiner

METHOD OF AND SYSTEM FOR BUILDING UP A DENTAL OBJECT

FIELD OF THE INVENTION

The invention relates to a method of building up a dental object and in particular a method in which the object is built up from a hardenable composition prepared from mixing of two or more components. The invention further relates to a system for building up the dental object.

BACKGROUND ART

In the field of dentistry, the restoration of a patient's tooth or teeth generally includes the replacement of the natural tooth substance by an artificial substance. For larger restorations, pre-finished dental restorations or prostheses are commonly used to replace the tooth or teeth or at least part of those.

Dental restorations are often manufactured in automated processes, which typically include the use of Computer Aided Design (CAD) techniques and manufacturing by Computer Numerical Controlled (CNC) machines.

In the manufacturing of dental restorations various automated processes are established in practice. One common method includes the preparation of standardized blanks that subsequently can be used to machine individual dental restorations or precursors thereof by removing material from the blank. Except for providing such blank at a sufficient size suiting for a multiplicity of different types of dental restorations, the shape of the blank typically does not correlate with any individual shape of a tooth in patient's mouth.

While such processes provide various advantages meanwhile so-called build-up processes have been proposed for making dental restorations. Such a build-up process typically allows building up an individual dental restoration in substantially its desired individual shape, generally by subsequently adding material to create that shape instead of providing an oversized standardized blank from which material is removed in a subsequent process.

For example WO 2012/078533 describes such a build-up process and corresponding devices for making a dental restoration from a powdery ceramic material. WO 2013/095968 describes a method and system for providing a dental restoration with an individual color within an automated manufacturing process.

Although existing processes for making dental restoration are advantageous in different respects there is a general desire to provide a process for making individual or customized dental restorations at a high degree of automation, maximized quality and minimized costs.

SUMMARY OF THE INVENTION

The invention relates in one aspect to a method of building up a dental object, in particular of building up a dental restoration and/or an orthodontic appliance. The method comprises the steps of:
(i) determining the three-dimensional shape of the object in the form of computer processible data which represent said shape;
(ii) mixing at least a first and a second component to form a hardenable composition;
(iii) depositing the hardenable composition through a nozzle;
(iv) performing steps (ii) and (iii) in combination with moving the nozzle by computer control based on said data to build up the object by incremental depositing the hardenable composition.

The invention is advantageous in that it allows building up of an object from a liquid or pasty material which is hardenable particularly by chemical reaction. This is in contrast to methods of the prior art which are based on a material that hardens due to cooling a melt of that material. The invention is further advantageous in the dental and orthodontic area because it allows the preparation of objects (dental restorations and/or orthodontic brackets) which have a color that resembles the color or color gradation of a natural tooth. Further the invention helps in the preparation of objects that are relatively geometrically precise and which exhibit a predetermined color gradation. The invention is particularly advantageous in that it allows the making of dental restorations at a maximized geometric and optical quality.

The dental object is particularly a solid physical object. For the purpose of the present specification the term "hardenable" involves polymerization of a starting material.

In an embodiment the hardenable composition is selected and the steps (ii) and (iii) are performed so that the hardenable composition is not yet fully hardened in step (iii). The hardenable composition is for example selected such that it exhibits a predetermined working time. For the purpose of the present specification, during the working time the hardenable composition is still flowable (liquid or pasty). Further, the hardenable composition is preferably mixed and deposited in a continuous cycle. This means that in the continuous cycle the first and second component are supplied, mixed and deposited incrementally during a continuous flow. Although the object is typically built up in a multiplicity of increments the increments as such are preferably based on the continuous cycle of supplying, mixing and depositing. This is in contrast to a batchwise procedure in which predetermined quantities are mixed first and the mixed amount is deposited after.

In one embodiment the method further comprises the step of providing a third component. The third component is preferably configured to provide the hardened to composition with a different material property than the second component.

Preferably the first and second component, and optionally the third component, are continuously supplied to a mixing means. A mixture of the first and second component, and optionally the third component, are preferably continuously exiting the mixing means. The mixture is preferably guided through the nozzle for being deposited. The first, second and optionally the third component are preferably mixed as they flow through the mixing means and in combination form the hardenable composition upon exiting the mixing means. A mixing means as it may be used with the present invention may be a dynamic mixer. Such a dynamic mixer may comprise a mixing barrel having an inlet end through which the individual components can enter into the mixing barrel and an outlet end from which the mixture from the individual components can exit the mixing barrel. A mixing rotor is preferably arranged within the mixing barrel which is configured to agitate the components as they flow through the mixing barrel. Preferably the mixing rotor has mixing paddles which rotate essentially in a plane that is transverse to the flow of the components. The mixing rotor is preferably motor driven. Alternatively, the mixing means is a static mixer. The static mixer also comprises a mixing barrel having an inlet end through which the individual components can enter into the mixing barrel and an outlet end from which the mixture from the individual components can exit the mixing barrel. However instead of a mixing rotor a mixing helix is preferably arranged within the mixing barrel. The skilled person will recognize that the mixing helix may not correspond to one ideal helical structure, but may comprise a series of deflectors that in some embodiments are based on a helical shape. The mixing helix is configured to successively split and merge the flow of the components in a certain way to form a mixture from the components and thereby the hardenable composition.

In an embodiment the second and the third component are configured to provide the hardened composition with different physical properties, in particular different colorings, different hardnesses, different E-modules, and/or different translucencies. For example the hardenable or hardened composition mixed from the first and second component may have a different color/translucency than the hardenable or hardened composition mixed from the first and the third component. Thus, by control of the amount of the second and/or the third component in a mixture with the first component, the color/translucency of the hardenable/hardened composition can be controlled.

In a further embodiment the first component forms a light hardenable resin. Such hardenable resin preferably comprises a photo initiator. The photo initiator may be based for example on camphorquinone which initiates the composition to polymerize and thus to harden when exposed to visible light of a wavelength in a range of 400 nm to 550 nm (nm=nanometers).

In a further embodiment the second and third components preferably comprise coloring agents. The coloring agents or a composition of one or more coloring agents are preferably different for the second and the third component. The first component may for example be generally colorless (for example transparent or translucent) or may have a base color. Accordingly the hardenable composition may be provided with the desired color by the first, second and/or the third component in combination.

Preferably the first component for mixing is supplied at a first flow rate A, the second component for mixing is supplied at a second flow rate B and the third component for mixing is supplied at a third flow rate C. The first, second and third (and optionally further components) are preferably supplied simultaneously and merged in the proportions as they are supplied. Preferably, a common flow rate D is formed by the second flow rate B, the third flow rate C and optionally one or more further flow rates of further components in combination. This means that preferably the common flow rate of the components B and C (and optionally further components) is constant. Further, also the flow rate of the component A is preferably constant. Hence, preferably the mixing ratio of A:D is constant. It is noted that any "further components" as referred to before may be configured to provide the hardened composition with different colorings and/or translucencies. Further, preferably the mixing ratio of B:C (or B:C:further components) is variable. Preferably, the proportions of the components B, C and further components can be adjusted within a continuous range from zero to a predetermined maximum.

In an embodiment the hardenable composition is a dental composition. For example 3M Filtek Supreme XTE or a dental composition consisting of 65 wt. % organic matrix (70 wt. % D-Zethacrylate, 30 wt. % DESMA), 33 wt % $SiO_2$ and 2 wt. % photoinitiator.

In one embodiment the shape of the object corresponds to the shape of a dental object, for example a dental restoration (like a dental crown, inlay, only or a dental bridge) or an orthodontic bracket.

In a further embodiment the object may form a dental blank from which a dental object is obtainable by material removal. The dental blank may correspond to an oversized precursor of the dental object, for example a so-called near net shape blank. The oversize may be based on an offset of the outer shape of the dental object. Alternatively the oversize may be based on a proportional enlargement of the outer shape of the object. In this regard the outer shape refers to those surface portions of the dental object which is exposed when installed in a patient's mouth, whereas the inner shape refers to the remaining surface portions of the dental object forming the interface to the substructure (tooth, tooth stump, implant, abutment for example) on/in which the dental object is received.

In one embodiment the method further comprises the step of providing a geometrically predetermined support structure. Such geometrically predetermined support structure may be a physical replica of a substructure in a patient's mouth. Such a substructure may be a natural tooth or natural tooth stump prepared to receive a dental restoration, a dental abutment or a dental implant, for example. The physical replica may be formed by a plaster model (or a physical model made of another material). Such physical replica may be obtained from a dental impression of the patient's teeth, from which the model is cast. Alternatively, the physical replica may be obtained from scanning the patient's teeth and manufacturing the physical replica by computer controlled processes based on the scan, for example by machining and/or rapid prototyping techniques.

The method may further comprise the step of depositing the hardenable composition directly onto the support structure to form a dental blank. In this step the hardenable composition is not yet hardened. Therefore, the hardenable composition adapts or conforms to the shape of those portions of the support structure to which it is deposited. This provides for minimizing tolerances of those portions of the dental object which are to be received on a substructure in the patient's mouth.

The method may further comprise the step of using the support structure to receive the dental blank in a receptacle of a milling or grinding machine. This helps maximizing the precision of the positioning in the machine. This further eliminates the need of otherwise suspending or clamping the dental blank in the machine. The support structure may comprise a reference structure allowing the positioning of the support structure in the machine. Such reference structure may have a predetermined three-dimensional shape which has a predetermined three-dimensional distance and/or angulation relative to the dental blank/object.

The method may further comprise the step of machining a dental object from the dental blank. The step of machining may be performed by aid of the milling or grinding machine.

In an embodiment the method further comprises the step of exposing the hardenable composition with excitation for modifying the viscosity, for example ultrasound, during depositing. The ultrasound may be applied to the mixing means and/or to the nozzle. Thus, the viscosity of the hardenable composition may be temporarily reduced under the influence of the ultrasound so that in consequence the flow and conformability of the hardenable composition may be increased relative to the same hardenable composition not being exposed to ultrasound. This helps maximizing the accuracy of the deposition and thus maximizing the geometrical precision of the object built up.

In a further embodiment the method further comprises the step of irradiating increments of deposited hardenable composition. The irradiation may be performed continuously or intermittently synchronized with any deposition of hardenable composition.

In a further aspect the invention relates to a system for building up a dental object. The system comprises a control unit for processing data that are representative of a three-dimensional shape of the object. The system further comprises mixing means for mixing at least a first and a second component to form a hardenable composition. Further, the system comprises a support for building up the object from the hardenable composition and a nozzle for depositing the hardenable composition onto the support. The system is preferably configured such that the support and the nozzle are movable relative to each other in three dimensions based on a Cartesian coordinate system.

The system comprises means for urging the first, second and optionally further components toward the mixing means. Preferably such means comprise a container for each of the components and a piston for expelling the respective component out of the container. The skilled person will recognize other possibilities for urging the components toward the mixing means, for example via pressurizing by gas pressure or using a pump. The system is preferably configured to urging the first, second and optionally further components toward the mixing means, in which the components are mixed, and for urging the mixture out of the mixing means and through the nozzle. The system is preferably generally configured for performing the method of the invention or a subset of method steps of the invention.

The system comprises further a drive unit for moving the nozzle and the support relative to each other on a three-dimensional path by computer control based on said data. Thereby the object can be built up by incremental depositing the hardenable composition.

In an embodiment the system comprises a light source, preferably a light source emitting blue light. The light source is configured to irradiate any hardenable composition with light. In particular the light source may be adapted to provide predominantly blue light in comparison to white light.

For the purpose of the present specification the term "blue light" refers to light having a wavelength within the range of about 430 nm to 500 nm, preferably within a range of about 430 nm to 480 nm. For the purpose of the present specification the term "white light" refers to light having a wavelength within a range of about 380 nm to 780 nm. Although white light may also comprise light at wavelengths overlapping with the range of wavelengths of blue light, white light preferably does not predominantly consist of light within the range of blue light but has significant portions of visible light at wavelengths outside the range of blue light. In contrast blue light preferably predominantly consists of light within a range of about 430 nm to 480 nm. Blue light may particularly not comprise light having a wavelength outside the range of about 430 nm to 480 nm at a substantial intensity or at all. In particular blue light may have a first portion of light within a range of about 430 nm to 480 nm and preferably does not have a significant second light portion within a range of 570 nm and 590 nm, wherein the maximum intensity of the second portion of light is preferably less than 10% and more preferably less than 1% of the maximum intensity of the first portion of light. Further blue light may not have a significant third light portion within the spectrum of visible light outside the range of 430 nm and 480 nm and outside the range of 570 nm to 590 nm, wherein the maximum intensity of any third portion of light is preferably less than 25% and more preferably less than 20% of the maximum intensity of the first portion of light.

DETAILED DESCRIPTION OF THE INVENTION

Figure 1:
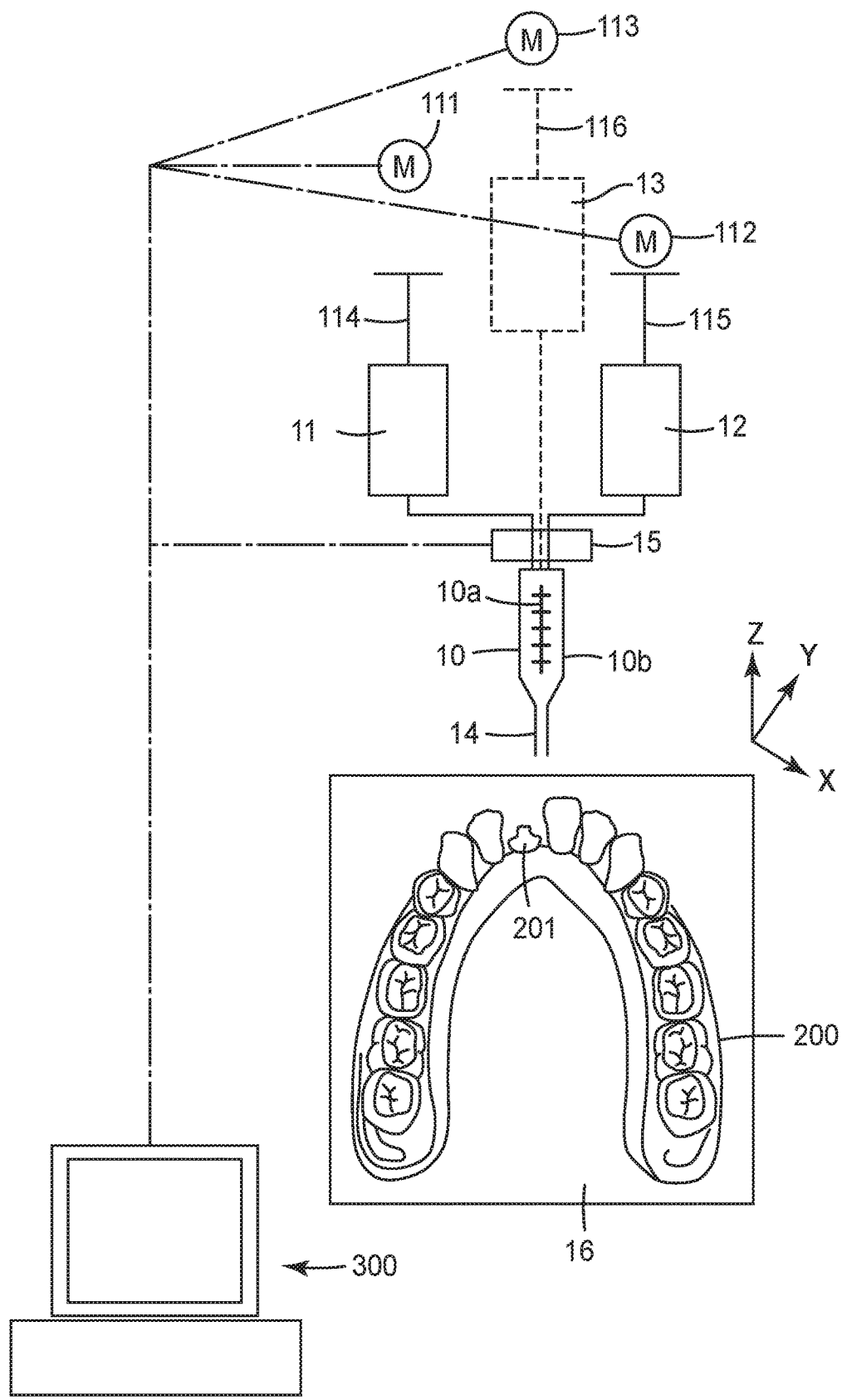
FIG. 1 is a diagram illustrating a system according to an embodiment of the invention.

FIG. 1 shows a system for building up a dental object, in particular a system for building up a physical dental restoration. The system comprises a mixing means 10 which is in fluid connection with a first container 11 and a second containers 12. Each of the first and second container 11, 12 holds a component A and a component B, respectively, which are adapted to form a hardenable composition when merged. Typically the components A and B are of different chemical configuration. In one example the components A and B are adapted to chemically react with each other upon being merged and/or mixed. In another example the components A and B are adapted to chemically react with each other in consequence of additionally exposing the mixture of the first and second component to light. In absence of the light such hardenable composition does not harden or hardens significantly slower than with the exposure of light. Light hardenable dental compositions may for example comprise a photo-initiator like camphorquinone or Irgacure™ 819 which initiates the composition to polymerize and thus to harden when exposed to visible light or blue light of a wavelength in a range of 400 nm to 550 nm (nm=nanometers). For exposing the hardenable composition with light the system may be furnished with a light device, for example a LED-based light device, which can be controlled (for example switched on or off) automatically.

A third container 13, which in the illustrated example is optional, is indicated for holding a component C. In an example in which the third container 13 is present the hardenable composition can be prepared from merging or mixing two of the three components or all three of the components A, B and/or C. The component C may have a similar configuration as component B. Therefore, the components A and C are adapted to chemically react with each other upon being merged and/or mixed (optionally with additional exposure of light as described before). Further, the hardenable composition may be prepared from merging or mixing the components A, B and C. The components B and C may be of a similar chemical configuration but may differ in color and/or in translucency. In the following it is referred to simply as "color" although the color and/or the translucency may be concerned. Accordingly, a hardened composition prepared from components A and B has a different color than a hardened composition prepared from components A and C. A hardened composition prepared from components A, B, and C accordingly has a different color than the hardened compositions prepared from components A and B or A and C. It is preferred that in a mixture of the components the proportion of component A is constant and the proportion of the components B and C can be varied. However, the total of B and C is preferably constant also. Further components and containers may be provided, in which case the total of B, C and further components is preferably constant. The components B, C and optionally further components therefore form one common flow rate which may be designated as "D", and the mixing ratio between A:D is preferably constant.

In the following it is generally referred to component A, B and C and associated technical features although further components and associated features are optionally provided. The system is configured to supply the components A, B and C into the mixing means, which in the example comprises a dynamic mixer. The dynamic mixer has a mixing rotor 10a and a mixing barrel 10b within which the mixing rotor is arranged. The system is configured for urging the components into the mixer. Thus the components enter the mixer at one end of the mixing barrel and are mixed as they flow toward the opposite other end of the mixing barrel. A nozzle 14 is attached to the mixing means 10 for guiding the mixture exiting the mixing means 10 toward a nozzle outlet 14.

The components may be urged toward the mixing means by pressure exerted by first, second and third pistons 114, 115, 116. The system is preferably adapted for adjustably controlling the mixing ratio between the components A, B and C. In the illustrated example a control valve 15 is provided for controlling the flow rate of the components A, B and C from the containers 11, 12, 13 toward the mixing means 10 relative to each other. In a simple configuration such a control valve has three cutoff valves which provide for permitting a flow of the respective component A, B or C, or for blocking the flow of the same component. With such a control valve mixtures from components A and B, A and C or A, B and C can be prepared in the system. The skilled person will recognize that instead of cutoff valves adjusting valves may be used. However, for precisely controlling a mixing ratio it has been found advantageous to drive the pistons 114, 115, 116 in a controlled manner. Therefore the system has a first, second and third motor 111, 112, 113. The motors 111, 112, 113 and the pistons 114, 115, 116 cooperate such that the feed of each of the pistons 114, 115, 116 can be controlled at a certain constant speed. Thus, also the flow of each of the components A, B and C can be controlled at certain constant flow rate to provide a certain determined mixing ratio. Preferably the feed/flow rate can be controlled within a continuous range from zero to a certain maximum flow rate. Accordingly a multiplicity of different mixing ratios from the components A, B and C can be provided with the system. It is noted that although the control valve 15 has certain advantages, like for example the prevention of after flow, the control valve 15 is optional for the principle function of the system.

The described components form a dispensing subsystem for preparing a hardenable composition from components A, B and C at different mixing ratios, in particular at different colors. This dispensing subsystem further provides for the hardenable composition to be dispensed via the nozzle 14. The hardenable composition is preferably a hardenable dental composition and the different colors preferably are different tooth colors.

The system further comprises a support 16 for building up an object from the hardenable composition. In the example, a geometrically predetermined support structure 201 is arranged on the support 16. Accordingly the object may be built up on the support structure 201. In the example the support structure 201 is a replica of a prepared tooth in a physical model 200 of a patient's jaw, for example a plaster model or a model made of another material like a resin, for example a model that was built up in another 3D printing process. The support structure 201 represents a tooth stump which is prepared for receiving a dental crown. The object may however also be built up directly on the support structure 200.

The system further comprises a drive unit (not shown). The drive unit provides for moving the nozzle 14 and the support 16 relative to each other on a three-dimensional path by computer control. The skilled person will recognize that the drive unit may be provided for moving either one or both of the nozzle 14 and/or the support 16. Further, the drive unit in the example has individual drives for moving the nozzle 14 and the support 16 relative to each other on three axes X, Y and Z on the corresponding three different dimensions of a X, Y and Z Cartesian coordinate system as indicated in the Figure.

The system has a control unit 300 for, inter alia, processing data that are representative of a three-dimensional shape of the object. Further, the computer control of the movement is based on that data. Thus, the object can be built up by incrementally depositing the hardenable composition to the support 16 or support structure 201 by computer control. The control unit 300 preferably further is adapted to control the feed of the pistons 114, 115, 116, the control valve (if present) and the dynamic mixer (for example the mixing speed and/or the activation and deactivation of the mixer). Further the control unit preferably has an interface for exchanging data, in particular for receiving data that are representative of the three-dimensional shape of the object.

In particular, the object, or a part of the object, can be built up by continuously dispensing the hardenable composition and simultaneously (at least generally) continuously three-dimensionally positioning the nozzle in a controlled manner. It is noted that for the purpose of the present specification a generally continuous three-dimensional positioning is also achieved by a stepper motor based drive unit although in fact the stepper motor moves in small increments. Further, during continuously dispensing and positioning the mixing ratio between components A, B and C, and thus the color of the hardenable composition, can be varied. Therefore the system allows for building up a color graded object, in particular a color graded dental restoration. By varying the color within a continuous range during dispensation and positioning the color gradation can be provided continuously also. Hence, the system allows for providing a dental restoration which may pleasantly resemble a natural tooth structure. The system further allows for building up an object which is graded with respect to other properties like color. For example, materials of different hardness or E-module may be used to make the dental restoration.

Figure 2:
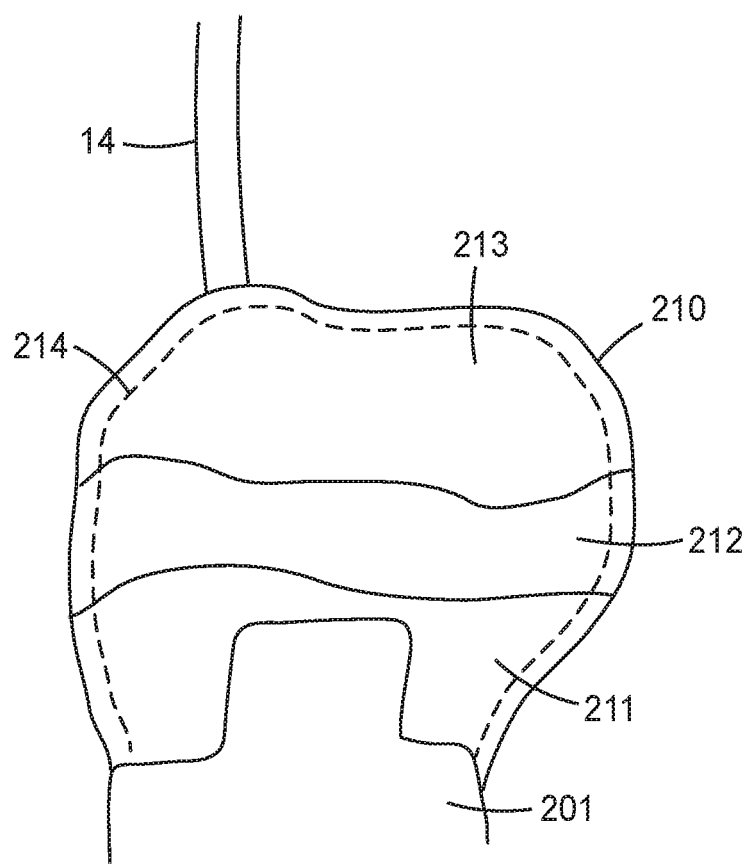
FIG. 2 is a front view of a dental restoration built up on a support structure according to an embodiment of the invention.

FIG. 2 shows the object, in the example a precursor of a dental crown 210, built up from the hardenable composition. The dental crown precursor 210 was built up directly on the support structure (the replica of the tooth prepared to receive the dental crown). Because the hardenable dental composition is dispensed having a generally liquid or pasty consistency before it hardens, the composition first deposited to the support structure precisely conforms to the shape of the support structure independent from any accuracy the system provides for positioning the nozzle 14 and the support structure relative to each other. Accordingly, the final dental crown can be provided with a precisely shaped interface to the tooth stump of the patient. Optionally the support structure may be proportionally three-dimensionally over-sized to account for an adhesive to be arranged between the crown and the tooth stump in the patient's mouth. On a plaster model, which is typically obtained from molding in a dental impression of the patient's tooth or teeth, such oversize may be provided by a coating, for example a layer of a resin or wax. A digitally formed physical model may however be provided directly with the oversize.

The dental crown precursor 210 in the example is built up from a first portion of hardenable composition 211 having a first tooth color, a second portion of hardenable composition 212 having a second tooth color, and a third portion of hardenable composition 213 having a third tooth color. The first, second and third tooth colors are different. Thus, the dental crown resembles the color gradation of a natural tooth. It is preferred that the colors of the dental crown and the geometric location of the colors in the crown (or another dental restoration prepared by the system) are selected to match with the color gradation of the neighboring and/or the opposite teeth. Thus, the crown (or other dental restoration) will pleasantly conform to the optical appearance of the remainder of the patient's teeth. The skilled person will recognize that a dental restoration may be provided with more or less than three colors in various geometric locations of the dental restoration.

Typical tooth colors as useful for the present invention may comprise the colors B1, A1, B2, D2, A2, C1, C2, D4, A3, D3, B3, A3.5, B4, C3, A4, C4 according to the VITA Classical Shade Guide of the company VITA Zahnfabrik, Germany.

The dental crown precursor 210 may be oversized relative to the shape of the dental crown 214 as indicated by the dashed line. This allows for building up the dental crown precursor 210 with a relative precise color gradation and to provide the final crown at a relatively precise shape by material removal (for example by milling and grinding). Further, the finishing of an object (for example the crown or another dental restoration) by removing material from an object built up from a hardenable material has been found advantageous in that the outer surface of the hardened material which interacted with the environment during hardening is taken away. Such an outer surface may, depending on the composition used and the environment, have different mechanical and/or optical properties in comparison to the composition further inside the object. Accordingly, an object or dental restoration having overall relative homogeneous mechanical and/or optical properties may be achieved.

The invention claimed is:

1. A method of building up a dental object, comprising:
   (i) determining a three-dimensional shape of the dental object in the form of computer-processable data which represents the three-dimensional shape;
   (ii) providing a first component, a second component, and a third component,
   (iii) mixing the first component, the second component, and the third component to form a hardenable composition,
      the first component comprising a light-polymerizable composition and a photoinitiator,
      the second component comprising a coloring agent, and
      the third component comprising a coloring agent,
      wherein at least one combination of the first component, the second component, and third component are mixed at a variable ratio for a period while continuously dispensing;
   (iv) depositing the hardenable composition through a nozzle; and
   (v) performing steps (iii) and (iv) in combination with moving the nozzle by computer control based on the computer-processable data to build up the dental object by incremental depositing the hardenable composition,
   wherein the mixing of the first component, the second component, and the third component is effective in providing color-graded hardened composition.

2. The method of claim 1, wherein the hardenable composition is selected and wherein the steps (iii) and (iv) are performed so that the hardenable composition is not yet fully hardened in step (iv).

3. The method of claim 1, wherein the second component and the third component are configured to provide the color-graded hardened composition with different physical properties, selected from different colorings, different hardnesses, different E-modules, different translucencies, and a combination thereof.

4. The method of claim 3, wherein the first component, the second component and the third component are supplied at a first flow rate A, a second flow rate B and a third flow rate C, respectively, the second flow rate B and the third flow rate C and together are defined by a common flow rate D,
   wherein the common flow rate D is constant, and
   wherein a mixing ratio of flow rate A:flow rate D is constant.

5. The method of claim 4, wherein a ratio of flow rate B:flow rate C is variable.

6. The method of claim 1, wherein the hardenable composition is a dental composition.

7. The method of claim 6, wherein the dental object is in a shape of a dental restoration or an orthodontic bracket.

8. The method of claim 6, wherein the dental object is a dental blank.

9. The method of claim 1, further comprising:
   providing a geometrically predetermined support structure;
   depositing the hardenable composition directly onto the support structure to form a dental blank;
   using the support structure to receive the dental blank in a receptacle of a milling or grinding machine; and
   machining by aid of the milling or grinding machine a dental object from the dental blank.

10. The method of claim 1, further comprising the step of exposing the hardenable composition to excitation for modifying the viscosity during depositing.

11. The method of claim 1, further comprising irradiating increments of a deposited hardenable composition.

* * * * *

UNITED STATES PATENT AND TRADEMARK OFFICE
CERTIFICATE OF CORRECTION

PATENT NO. : 11,071,607 B2
APPLICATION NO. : 15/775044
DATED : July 27, 2021
INVENTOR(S) : Mayr et al.

Page 1 of 1

It is certified that error appears in the above-identified patent and that said Letters Patent is hereby corrected as shown below:

In the Claims

Column 10
Line 3, In Claim 1, before "third component" insert -- the --.
Line 31, In Claim 4, delete "flow rate A:flow rate D" and insert -- flow rate A : flow rate D --, therefor.
Line 33-34, In Claim 5, delete "flow rate B:flow rate C" and insert -- flow rate B : flow rate C --, therefor.

Signed and Sealed this
Twenty-seventh Day of December, 2022

Katherine Kelly Vidal
*Director of the United States Patent and Trademark Office*